Patented Nov. 14, 1950

2,530,339

UNITED STATES PATENT OFFICE 2,530,339

COMPOUNDED PETROLEUM HYDROCARBON PRODUCTS

Louis A. Mikeska, Westfield, and Allen R. Kittleson, Cranford, N. J., assignors to Standard Oil Development Company, a corporation of Delaware No Drawing. Application December 24, 1946, Serial No. 718,258

22 Claims. (Cl. 252—32.7)

This invention relates to the improvement of hydrocarbon oils derived from petroleum sources and more particularly to the preparation of improved lubricating oil compositions.

This application is a continuation-in-part of our co-pending application Serial Number 425,383, filed January 1, 1942, now Patent No. 2,415,833, issued February 18, 1947.

In the development of petroleum lubricating oils the trend has been to use more and more efficient refining methods in order to reduce the tendency of the oils to form carbon and deposits of solid matter or sludge. While such highly refined oils possess many advantages, their resistance to oxidation, particularly under conditions of severe service, is generally decreased and they are more prone to form soluble acidic oxidation products which are corrosive. They are generally less effective than the untreated oils in protecting the metal surfaces which they contact against rusting and corrosion due to oxygen and moisture. They also often deposit thick films or "varnish" on hot metal surfaces, such as the pistons of internal combustion engines. It has now been found that these difficulties can be greatly reduced by adding to the oils a small proportion of a new class of improving agents or compounds. These agents are particularly effective in reducing the corrosive effects of lubricating oils in contact with copper-lead and cadmium-silver bearings and in maintaining a clean engine condition.

The new improving agents of this invention may be described broadly as aromatic methlyene derivatives of thio acids of phosphorus, such derivatives being more particularly defined by the formula

where Ar is an aromatic group, R is a hydrocarbon radical, i. e., an alkyl, aryl or alkaryl group, which may or may not contain one or more substituents such as halogen atoms, hydroxyl groups, carboxyl groups, ester groups, ether groups, or thioether groups. $n$ represents 0 or 1, depending upon whether the compound is derived from a thiophosphorous or thiophosphoric acid. $m$ represents a small integer indicating the number of phosphorus acid groups which are attached to the aromatic group. The aromatic group also contains a group —OT, where T is hydrogen or a metal equivalent of hydrogen, which is attached to an aromatic nucleus, and contains also an alkyl group R' of at least 4 carbon atoms which is also attached to an aromatic nucleus.

The compounds described above are conveniently prepared first from a chlormethyl phenol or like intermediate, e. g., by reacting an alkylated phenol with formaldehyde in the presence of hydrogen chloride, and then reacting this intermediate with an organo thiophosphorous or thiophosphoric acid, or with a salt of such acid.

The reaction between an alkylated phenol, formaldehyde and hydrogen chloride, which is employed in the formation of typical intermediates, is satisfactorily conducted by passing dry hydrogen chloride continuously through the reaction mixture when concentrated aqueous hydrochloric acid is used as an initial reagent. The reaction may also be conducted under anhydrous conditions, using as a reaction medium a non-aqueous solvent, such as benzene. A typical alkylated phenol which has been found to be particularly useful in the present invention is tertiary octyl phenol, formed by reacting phenol with diisobutylene in the presence of sulfuric acid. When this tertiary octyl phenol is reacted with formaldehyde in the presence of hydrogen chloride, a mixture of chlormethyl derivatives is formed consisting of varying quantities of the following:

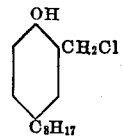

chlormethyl diisobutyl phenol

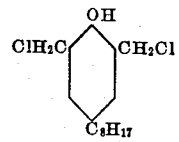

bis chlormethyl diisobutyl phenol

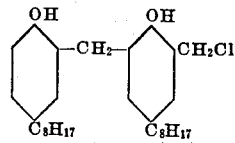

chlormethyl bis (diisobutyl hydroxy phenyl) methane, and

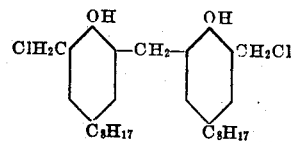

bis (diisobutyl chlormethyl hydroxy phenyl) methane

The mixture prepared as above described may conveniently be employed in the further reaction with a thiophosphoric acid or the like without separation into its constituents; but it is to be understood that the individual compounds of the above mixture may be separated and used individually, or they may be prepared by other suitable means as individual compounds. Instead of alkylated phenols, alkylated phenol sulfides may be employed to form intermediates in the manner described above and the resulting products reacted to form hydrocarbon oil additives in accordance with the present invention.

The phenols used in any of the above-described processes include generally all nuclearly hydroxylated aromatic compounds having phenolic properties and a readily replaceable nuclear hydrogen atom which is preferably ortho or para to the hydroxyl group. Phenols extracted from petroleum oils may be used as obtained or after alkylation to prepare the chlormethyl derivatives. Also, naturally occurring phenols such as those found in vegetable oils, for example, cardanol, obtained from cashew nuts, may be used. As indicated above, it is preferred that the phenols contain an alkyl group of at least four carbon atoms attached to the nucleus. This group may be introduced by alkylating any of the above-described phenols which do not already contain suitable alkyl groups. The alkyl phenols may be prepared by the alkylation of phenols with olefins, including mixtures of olefins such as those obtained in cracked petroleum fractions, and by the alkylation of phenols with alkyl halides, including chlorinated paraffin wax and chlorinated petrolatums derived from petroleum. Such chlorinated waxes may contain dichlorides and polychlorides and may be used in alkylating phenols by the customary Friedel-Crafts type of synthesis to give complex alkylated phenols of high molecular weight in which several phenol radicals are linked by alkyl radicals in a single molecule. These high molecular weight complex alkyl phenolic products, when used in the reactions described herein, give products which are effective in reducing the pour point of waxy oils and in raising the viscosity index of lubricating oils as well as in improving their lubricating properties, such as film strength, and their stability and resistance to oxidation.

Alkylated phenol sulfides may be employed in place of the phenols, and they may be defined by the formula

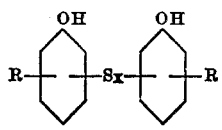

where R represents at least one alkyl group of at least four carbon atoms, and $x$ is a small number, generally from 1 to 4. The compounds may be conveniently formed by reacting an alkylated phenol with a sulfur halide.

The second major step in the preparation of the new additives of the present invention consists in reacting the chlormethyl phenol or like intermediate product with an organo-substituted thiophosphorous or dithiophosphoric acid, e. g., a dialkyldithiophosphoric acid, or a metallic salt of such acid. The reaction proceeds more readily with the metallic salts, such as alkali metal salts. The use of a solvent, such as absolute ethyl alcohol, is desirable, and heating to a refluxing temperature is helpful for promoting the reaction, although heating is not essential, particularly when reacting with metallic salts. The products may be purified by the usual methods, these being illustrated in the examples which are described in detail below.

Detergent properties may be imparted to the additives described above by converting them into metallic salts. This may be accomplished by reacting them with metallic bases, metallic alcoholates, and similar compounds.

The following examples illustrate the preparation of intermediates and final products in accordance with the present invention, and the testing of such products for their value as additives in lubricating oils; but it is to be understood that these examples are illustrative only and are not intended to limit the scope of the invention in any manner.

EXAMPLE 1.—CALCIUM SALT OF TERT.-OCTYLHYDROXYPHENYLMETHYL DIOCTYLDITHIOPHOSPHORIC ACID (a) Preparation of chlormethyl-tert.-octylphenol A 3-way flask equipped with a stirrer, return condenser, and a thermometer, was charged with 360 gm. of trioxymethylene and 900 ml. of benzene. Dry hydrogen chloride gas was then passed through the mixture with rapid stirring at 25° C., for 2 hrs. 20 min., or until 179 gms. of hydrogen chloride had been absorbed. 824 gms. of tetramethylbutylphenol (tert.-octyl phenol) was then added to the reactor over a period of 18 minutes with sufficient cooling to keep the temperature of the reaction mixture below 25° C. The mixture was then stirred at 20° to 25° C. for an hour and fifteen minutes and at 45° to 50° C. for four hours, while a rapid stream of hydrogen chloride was passed through the reacting mixture. On completion of the reaction, the product was cooled, treated with 700 ml. of water and extracted with ether. The extract was washed free of hydrogen chloride and dried over sodium sulfate. The greater part of the ether was then removed under atmospheric pressure, while the last traces of the solvent were removed by heating at 70 C. under 2 mm. pressure. The residue consisted of 1010 gms. of a light colored very viscous oil which on analysis showed the following:

Found _____ Cl=13.27%
$C_{15}H_{23}OCl$, calculated _____ Cl=13.93%

(b) Preparation of tert.-octylhydroxyphenyl-methyl dioctyldithiophosphoric acid

A 3-way flask equipped with a stirrer, a return condenser and a dropping funnel was charged with 16.2 gm. (0.3 mol) of sodium methylate and 150 cc. of absolute ethyl alcohol. The dropping funnel was charged with 105.1 gm. (0.3 mol) of dioctyldithiophosphoric acid, prepared by condensing n-octyl alcohol with phosphorus pentasulfide. The acid was then added slowly to the sodium methylate solution with rapid stirring. The dropping funnel was then charged with 80.3 gm. (0.3 mol) of tert.-octylchlormethyl phenol (prepared as in (a)) dissolved in 150 ml. absolute alcohol. Then, while the reaction mixture was refluxed with rapid stirring, the solution in the dropping funnel was added to it over a period of 20 minutes. The reaction mixture was then refluxed for an additional two hours. The reaction product was then cooled, poured into water, acidified, and extracted with ether. The ether layer was washed free of hydrochloric acid and finally dried over $Na_2SO_4$. On removal of the solvent under reduced pressure, 170 gm. of brown viscous oil was obtained.

Found _____ P=5.02%   S=10.18%
Calculated _____ P=5.33%   S=11.01%

(c) Preparation of the calcium salt

The ester described above was converted into a calcium salt as follows: A 3-way flask equipped with a stirrer and a return condenser was charged with 100 ml. absolute ethyl alcohol, 2.5 gm. metallic calcium, and a small crystal of mercuric chloride. On addition of the latter, the calcium reacted vigorously with the alcohol. When all the calcium had dissolved, a solution of 58.1 gm. tert.-octylhydroxy-phenylmethyl-dioctyldithiophosphoric acid (prepared as in (b)) in 50 ml. absolute alcohol, was added to the reactor over a period of 10 min. The mixture was then stirred for 1 hr. at 60° C. and finally cooled and filtered off from a trace of insoluble material. The filtrate was then evaporated to dryness at 100° C. under reduced pressure.

The residue was obtained as a dark brown viscous liquid readily soluble in mineral oils.

Found _____ Ca=3.78  S= 9.32  P=4.67
Calculated _____ Ca=3.38  S=10.83  P=5.24

EXAMPLE 2.—CALCIUM SALT OF THE CONDENSATION PRODUCT OF DI(TERT.-OCTYLTHIOMETHYL-TERT.-OCTYLPHENYL) THIOPHOSPHITE AND CHLORMETHYL-TERT.-OCTYL PHENOL

(a) Preparation of tert.-octylthiomethyl-tert.-octyl phenol

Tert.-octylchlormethylphenol, prepared as in Example 1(a), was reacted with the sodium salt of tert.-octyl mercaptan as follows: A three-way flask equipped with a stirrer, a return condenser and a dropping funnel was charged with 900 ml. absolute ethyl alcohol. To this was then added gradually 40.3 gms. (1.75 mols) of metallic sodium with rapid stirring and sufficient cooling to control the reaction. When all the sodium had dissolved, 256 gms. (1.75 mols) of tertiary octyl mercaptan was added and the mixture was cooled to room temperature. The dropping funnel was then charged with 450 gms. (1.75 mols) of tert.-octylchlormethyl phenol dissolved in 400 ml. absolute ethyl alcohol. This solution was then added slowly to the reactor with rapid stirring. When all this reactant had been added, the mixture was refluxed with stirring for 2½ hours. The reaction product was then cooled, poured into water, acidified with hydrochloric acid, and then extracted with ether. The extract was washed free of hydrochloric acid and dried over sodium sulfate. On removal of the solvent at 100° C. under 2 mm. pressure, 502 gms. of the tertiary octylthiomethyl-tert.-octyl phenol was obtained as an amber-colored soft resin.

(b) Preparation of di(tert.-octylthiomethyl-tert.-octylphenyl) thiophosphite A three-way flask equipped with a stirrer and a return condenser was charged with 87.36 (0.24 mol) of tert.-octylthiomethyl-tert.-octyl phenol, i. e., the product of (a), 10.44 gms. (0.03 mol) of phophorus heptasulfide ($P_4S_7$), and 300 cc. dioxane. The mixture was then refluxed with rapid stirring for 5 hours, or until practically no more hydrogen sulfide was given off. The mixture was then filtered to remove a trace of undissolved material and the solvent was removed at 100° C. under reduced pressure. The residue consisted of 102 gms. of very viscous amber-colored oil. This oil probably consisted of a mixture of three mols of the thiophosphite and one mol of the dithiophosphate derivative.

(c) Preparation of the condensation product of di(tert.-octylthiomethyl-tert.-octyl-phenyl) thiophospite with chlormethyl-tert.-octylphenol A three-way flask equipped with a stirrer, a return condenser and a dropping funnel, was charged with 99 gms. (0.174 mol) of the produce of (b), 100 ml. benzene, and 100 ml. absolute ethyl alcohol. To this was then added at room temperature 9.4 gms. (0.174 mol) of sodium methoxide dissolved in 100 ml. absolute alcohol. The dropping funnel was then charged with 46.5 gms. (0.174 mol. of chlormethyl-tert.-octylphenol (Example 1(a)) dissolved in 150 cc. of absolute alcohol. This solution was then added slowly with rapid stirring to the solution in the reactor which was maintained at the boiling point while the former was added to the latter. After all the contents of the dropping funnel had been added to the reactor, the stirring and heating was continued for an additional 2 hours, whereupon the mixture was cooled, poured into water, acidified with hydrochloric acid and then extracted with ether. The ether extract was washed with water and dried over sodium sulfate. On removal of the solvent, 139 gms. of a soft yellow resin was obtained.

(d) Preparation of calcium salt

A three-way flask equipped with a stirrer, a return condenser and a thermometer was charged with 150 ml. absolute ethyl alcohol and a few small crystals of mercuric chloride. To this was added in small portions 3.4 gms. (0.085 mol) of metallic calcium. The mixture was finally refluxed until all the calcium had dissolved. The solution was then cooled to 60° C., whereupon 109 gms. of the product of (c) dissolved in a mixture of 200 ml. benzol and 200 ml. absolute ethyl alcohol was added over a period of 5 minutes, and the heating and stirring at 60° C. was continued for another hour. The reaction product was then filtered to remove a trace of insoluble material, the solvents were removed by distillation under reduced pressure, and the residue was finally dried at 100° C. under 2 mm. pressure. 104 gms. of tan-colored powder was thus obtained which consisted of the desired calcium salt.

EXAMPLE 3.—BEARING CORROSION TESTS

Blends of the product of Examples 1 and 2 in a lubricating oil base were submitted to a corrosion test designed to measure the effectiveness of the products in inhibiting the corrosiveness of a typical mineral lubricating oil toward the surfaces of copper-lead bearings. The base oil employed for the product of Example 1 was a paraffinic type mineral lubricating oil of SAE 30 grade, while the base oil employed with the product of Example 2 was a similar paraffinic of SAE 20 grade. The test was applied to the unblended base oils as well as to the blends. The test was conducted as follows: 500 cc. of the oil was placed in a glass oxidation tube (13 inches long and 2⅝ inches in diameter) fitted at the bottom with a ¼ inch air inlet tube perforated to facilitate air distribution. The oxidation tube was then immersed in a heating bath so that the oil temperature was maintained at 325° F. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each 4-hour period the bearings were removed, washed with naphtha and weighed to determine the amount of loss by corrosion. The bearings were then repolished (to increase the severity of the test), reweighed, and then subjected to the test for additional 4-hour periods in like manner. The results are given in the following table as "corrosion life," which indicates the number of hours required for the bearings to lose 100 mg. in weight, determined by interpolation of the data obtained in the various periods.

| Oil Blend | Bearing Corrosion Life |
|---|---|
| | Hours |
| Base Oil (SAE 30) | 9 |
| Base Oil+½% Product of Ex. 1 | 28 |
| Base Oil+1% Product of Ex. 1 | 30 |
| Base Oil (SAE 20) | 6 |
| Base Oil+½% Product of Ex. 2 | 33 |
| Base Oil+1% Product of Ex. 2 | 37 |

EXAMPLE 4.—CARBON BLACK DISPERSION TESTS

A carbon black dispersion test was carried out, as described in U. S. Patent 2,390,342, to measure the comparative effectiveness of the additives of the present invention as agents for dispersing sludge in lubricating oil. In this test 6% by weight of activated carbon was added to the oil blend containing the additive and thoroughly dispersed in the oil by stirring with an "egg beater" type mixer for 15 minutes while the temperature of the oil was maintained at 250° F. 250 cc. of the blend was then placed in a 250 cc. graduated cylinder and allowed to settle for 24 hours while the temperature was maintained at 200° F. If an additive is not a dispersing agent, the carbon black settles rapidly at this point leaving clear oil at the top in an hour or two. A very effective disperser will maintain the carbon black in suspension so that no change in the opaque slurry is apparent even after a 24-hour period. With all but the most potent dispersing agents stratification occurs with a black layer at the bottom (high concentration of carbon black) and a blue opaque layer at the top (reduced carbon black concentration). Cases of this type, known as "blue line" separations, are only detectable in reflected light. The base oil used for this test was a paraffinic of SAE 30 grade for the product of Example 1, and a similar oil of SAE 20 grade for the product of Example 2. The results of the test when applied to blends containing the products of Examples 1 and 2 are shown in the following table, in which the results are shown as the volume of dispersed carbon black remaining after the settling period.

| Additive Concentration | Cc. Dispersed Carbon Black |
|---|---|
| 0 (Unblended Base Oil) | 180 |
| ½% Product of Ex. 1 | 250 |
| 1% Product of Ex. 1 | 250 |
| 0 (Unblended Base Oil) | 180 |
| ½% Product of Ex. 2 | 250 |

The above results show that in the cases of the blends employed a perfect dispersion of the carbon black was maintained throughout the period of the test.

The amount of the additive of the present invention which is most advantageously employed in lubricating oils and other petroleum products will vary according to the purpose in adding the composition and the nature of the basic material; but generally when the composition is to be employed as a corrosion inhibitor and detergent in crankcase lubricating oils, the amount is from about 0.02% to about 2%, preferably from 0.1% to 1.0%. For convenient shipping and storage of the additives prior to incorporation in the lubricating oil base, it is desirable to prepare concentrates containing 25% to 50% of the compounds A further advantage in the use of the improving agents of this invention is the fact that many are soluble in highly paraffinic lubricating oils and may be used to prepare improved lubricants with highly refined base oils and greases having a viscosity index of 80 to 100 and even higher. Such oils may be obtained directly as distillate and residual fractions of paraffin base lubricants or by suitable refining, such as solvent extraction, hydrogenation and the like of lower quality lubricating oil fractions, such as those obtained from mixed base and asphaltic base crudes. Oils of viscosity indices below 80 may, of course, also be used. The viscosity and viscosity index of the base lubricating oils used in preparing the improved lubricants of the present invention should thus be selected with regard to the particular service for which the blended lubricant is intended. Thus, these oils may be obtained from various types of crudes such as paraffinic, naphthenic, asphaltic or mixed crudes, and they may be either plain distillates or fractions obtained by treating or refining of distillate or residual fractions by the various methods known to the art such as acid treating, clay treating, solvent extraction, dewaxing, etc., or they may be synthetic hydrocarbon oils resulting from various types of chemical reactions such as cracking, polymerization, condensation and the like. The present invention thus applies to the preparation of improved crankcase engine lubricants, turbine oils, highly refined light colored and white oils, as well as steam cylinder oils, gear oils, extreme pressure lubricants and greases, upper cylinder lubricants, slushing oils and the like.

While the products described herein are especially useful for improving mineral lubricating oils, these materials may also be used as improving agents in other petroleum hydrocarbon oils and products such as waxes, fuel oils, Diesel fuels, naphthas, gasoline, burning oil and the like.

If desired, other known addition agents or lubricant improving agents may be incorporated in the lubricants prepared according to the present invention to assist or make more effective the action of the above-described improving agents, and to improve the oil in other respects. These include the fatty acid and naphthenic acid soaps, which may be used in small amounts in the preparation of liquid oil compositions or in larger amounts in the preparation of greases, including both the anhydrous types and those containing water. Other addition agents that may also be included are the fatty oils, synthetic esters, sulfur and halogen compounds and other agents for increasing oiliness and film strength, and various thickeners such as polyisobutylene having a molecular weight above 1000, also pour depressants, other types of corrosion inhibitors, anti-oxidants, detergents, etc., such as the oil-soluble metal soaps, especially of the alkaline earth metals, etc.

Other assisting agents which are particularly desirable as plasticizers and defoamers are the higher alcohols having 8 or more carbon atoms and preferably 12 to 20 carbon atoms per molecule. The alcohols may be saturated straight and branched chain aliphatic alcohols, such as octyl alcohol ($C_8H_{17}OH$), lauryl alcohol ($C_{12}H_{25}OH$), cetyl alcohol ($C_{16}H_{33}OH$), stearyl alcohol, sometimes referred to as octadecyl alcohol ($C_{18}H_{37}OH$), and the like; the corresponding olefinic alcohols, such as oleyl alcohol; cyclic alcohols, such as naphthenic alcohols; and aryl substituted alkyl alcohols, for instance, phenyl octyl alcohol, octadecyl benzyl alcohol, and mixtures of any of these various alcohols, which may be pure or substantially pure synthetic alcohols. One may also use mixed naturally occurring alcohols such as those found in wool fat (which is known to contain a substantial percentage of alcohols having about 16 to 18 carbon atoms) and in sperm oil (which contains a high percentage of cetyl alcohol); and although it is preferable to isolate the alcohols from those materials, for some purposes, the wool fat, sperm oil or other natural products rich in alcohols may be used per se. Products prepared synthetically by chemical processes may also be used such as alcohols prepared by the oxidation of petroleum hydrocarbons, e. g., paraffin wax, petrolatum, etc.

It is not intended that this invention be limited to any of the particular examples, which have been presented only for purpose of illustration, as it is intended to claim all novelty inherent in this invention as broadly as the prior art permits.

We claim:

1. A product consisting essentially of a petroleum hydrocarbon material and from about 0.02 to about 2% of an aromatic methylene product of a thio acid of phosphorus, such product being a member of the group consisting of (1) compounds of the formula

and (2) mixtures of compounds of the above formula and compounds of the formula

where Ar in each of the above formulas is an aromatic nucleus selected from the class consisting of benzene rings, groups of two benzene rings linked by a methylene radical, and groups of two benzene rings linked by at least one sulfur atom, R is a hydrocarbon radical of the class consisting of alkyl and alkaryl groups, R' is an alkyl radical containing from about eight carbon atoms up to the number of carbon atoms characteristic of paraffin wax, T is a member of the class consisting of hydrogen and metal equivalents of hydrogen, R' and OT being attached to an aromatic nucleus, and m is a small integer.

2. A composition according to claim 1 in which the petroleum hydrocarbon material is a lubricating oil fraction.

3. A composition according to claim 2 in which R' is a tertiary octyl phenyl radical, in which T represents the calcium equivalent of hydrogen, and in which m equals 1.

4. A composition according to claim 3 in which R is a octyl group.

5. A composition according to claim 2 in which Ar is a benzene nucleus.

6. A composition according to claim 5 in which R is an octyl radical.

7. A mineral lubricating oil having incorporated therein about 0.02% to about 2% of the calcium salt of a tert.-octyl hydroxyphenylmethyl dioctyldithiophosphoric acid.

8. As a new composition of matter the calcium salt of tertiary octyl hydroxyphenylmethyl dioctyldithiophosphoric acid.

9. The process of preparing a compound having mineral oil stabilizing properties which comprises reacting a chlormethyl alkylphenol with a compound of the class consisting of dialkyldithiophosphoric acids, acids and metallic salts of such acids.

10. A process according to claim 9 in which the chlormethyl alkyl phenol is chlormethyl tertiary octyl phenol.

11. The process which comprises reacting tertiary octyl phenol with trioxymethylene in the presence of hydrogen chloride to form chlormethyl phenolic derivative and further reacting the latter product with the sodium salt of dioctyldithiophosphoric acid, the same having been prepared by condensing n-octyl alcohol with phosphorus pentasulfide, and then neutralizing the resulting dioctyldithiophosphoric acid with sodium methylate.

12. A mineral lubricating oil having incorporated therein about 0.02% to about 2% of the product obtained by reacting sodium tertiary octyl mercaptide with tertiary octylchlormethyl phenol, further reacting the product thus formed with phosphorus heptasulfide, further reacting the total phosphorus and sulfur-containing product thus formed, after conversion to the sodium salts of the constituents thereof, with chlormethyl-tert.-octylphenol, and finally converting the resulting condensation product into a calcium salt.

13. A lubricant consisting essentially of a mineral lubricating oil base and from about 0.02% to about 2% of an aromatic methylene derivative of a dialkyldithiophosphoric acid, wherein the aromatic methylene group replaces the hydrogen atom of the sulfhydryl group, wherein the aromatic nucleus is selected from the class consisting of benzene rings, groups of two benzene rings linked by methylene radicals, and groups of two benzene rings linked by at least one sulfur atom, and wherein the said nucleus contains at least one substituent alkyl side chain of at least four carbon atoms and at least one substituent radical selected from the group consisting of hydroxyl radicals and oxymetallic radicals.

14. A mineral lubricating oil having incorporated therein from about 0.02% to about 2% of the calcium salt of a product formed by reacting tertiary octyl phenol with trioxymethylene in the presence of hydrogen chloride to form a chlormethyl phenolic derivative and further reacting the latter product with the sodium salt of dioctyldithiophosphoric acid, the same having been prepared by condensing n-octyl alcohol with phosphorus pentasulfide, and then neutralizing the resulting dioctyldithiophosphoric acid with sodium methylate.

15. A mineral lubricating oil having incorporated therein about 0.02% to about 2% of the calcium salt of the product prepared by reacting tertiary octyl phenol with trioxymethylene in the presence of hydrogen chloride to form a chlormethyl tertiary octyl phenolic derivative, reacting such derivative with sodium tertiary octyl mercaptide to form a tertiary octyl thioether derivative, further reacting the product thus formed with phosphorus heptasulfide to form a mixture of dithiophosphoric and thiophosphorous acid derivatives, and further reacting the total phosphorus- and sulfur-containing products thus formed, after conversion to the sodium salts of the constituents thereof, with a portion of the aforesaid chlormethyl tertiary octyl phenolic derivatives.

16. As a new composition of matter the calcium salt of the product obtained by reacting sodium tertiary octyl mercaptide with tertiary octyl chlormethyl phenol, further reacting the product thus formed with phosphorus heptasulfide, and then further reacting the total phosphorus and sulfur containing product, thus formed, after conversion to the sodium salts of the constituents thereof, with chlormethyl tertiary octylphenol.

17. A composition consisting essentially of a mineral lubricating oil and the calcium salt of tert.-octylhydroxyphenylmethyldioctyldithiophosphoric acid, the amount of said salt being from 25 to 50% by weight of the entire composition.

18. A composition consisting essentially of a mineral lubricating oil and the calcium salt of a product obtained by condensing chlormethyl-tert.-octylphenol with a mixture of di-(tert.-octylmethyl-tert. - octylphenol) - thiophosphite and di - (tert. - octylmethyl - tert. - octylphenol) - dithiophosphate, the amount of the calcium salt being from 25 to 50% by weight of the entire composition.

19. The process which comprises reacting tertiary octyl phenol with trioxymethylene in the presence of hydrogen chloride to form a chlormethyltertiary octyl phenolic derivative, reacting such derivative with sodium tertiary octyl mercaptide to form a tertiary octyl thioether derivative, further reacting the product thus formed with phosphorus heptasulfide to form a mixture of dithiophosphoric and thiophosphorous acid derivatives, and further reacting the total phosphorus- and sulfur-containing products thus formed, after conversion to the sodium salts of the constituents thereof, with a portion of the aforementioned chlormethyl tertiary octyl phenolic derivatives.

20. As a new composition of matter a compound of the class consisting of (1) compounds of the formula

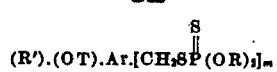

and (2) mixtures of compounds of the above formula and compounds of the formula (R').(OT).Ar.[CH₂SP(OR)₂]ₘ

where Ar in each of the above formulas is an aromatic nucleus selected from the class consisting of benzene rings, groups of two benzene rings linked by a methylene radical, and groups of two benzene rings linked by at least one sulfur atom, R is a hydrocarbon radical of the class consisting of alkyl and alkaryl groups, R' is an alkyl radical containing from about eight carbon atoms up to the number of carbon atoms characteristic of paraffin wax, T is a member of the class consisting of hydrogen and metal equivalents of hydrogen, R' and OT being attached to an aromatic nucleus, and m is a small integer.

21. A composition consisting essentially of a mineral lubricating oil and a composition as defined in claim 20, the amount of the latter composition being from 25 to 50% of the entire mixture.

22. As a new composition of matter a product having the formula

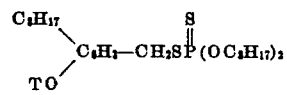

where T is a member of the class consisting of hydrogen and metal equivalents of hydrogen.

LOUIS A. MIKESKA.
ALLEN R. KITTLESON.

REFERENCES CITED

The following references are of record in the file of this patent:

UNITED STATES PATENTS

| Number | Name | Date |
|---|---|---|
| 2,242,260 | Prutton | May 20, 1941 |
| 2,293,445 | Nelson | Aug. 18, 1942 |
| 2,329,436 | Cook et al. | Sept. 14, 1943 |
| 2,361,746 | Cook et al. | Oct. 31, 1944 |
| 2,389,527 | McCleary | Nov. 20, 1945 |
| 2,419,650 | Giammaria | Nov. 5, 1946 |